United States Patent [19]
Jennings et al.

[11] Patent Number: 5,954,531
[45] Date of Patent: Sep. 21, 1999

[54] RELEASABLE LOCKING MECHANISM

[75] Inventors: William H. Jennings, Bedford, Va.; Mark William Weadon, Apex, N.C.

[73] Assignee: Ericsson Inc., Research Triangle Park, N.C.

[21] Appl. No.: 08/942,170

[22] Filed: Oct. 1, 1997

[51] Int. Cl.⁶ ..................................... H01R 13/73
[52] U.S. Cl. .......................................... 439/352; 403/325
[58] Field of Search .................... 439/352, 353, 439/357, 474; 403/325

[56] References Cited

U.S. PATENT DOCUMENTS

| | | | |
|---|---|---|---|
| 3,855,534 | 12/1974 | Holcomb et al. | |
| 5,203,022 | 4/1993 | Finch et al. | |
| 5,486,117 | 1/1996 | Chang | 439/353 |
| 5,580,182 | 12/1996 | Lin | 403/325 |

FOREIGN PATENT DOCUMENTS 0 391 020 A1  10/1990  European Pat. Off. .
297 05 730U1  5/1997  Germany .

*Primary Examiner*—Steven L. Stephan
*Assistant Examiner*—Eugene G. Byrd
*Attorney, Agent, or Firm*—Jenkens & Gilchrist, P.C.

[57] ABSTRACT

A plurality of arms extend outwardly from an accessory structure and are adapted to engage slots in a base structure to which the accessory structure is to be mounted. The arms are normally biased to a position at which they are freely insertable an removable from the slots in the base structure, and movable to a position at which the arms are locked in the slots in response to forcedly maintaining the arms at a spaced apart distance greater than the distance of which the arms are disposed in the normally biased position. The arms are returned to their normally biased position in response to depressing an actuator mounted in the accessory structure, and moved to the spaced apart locking position in response to releasing the actuator. The problems of fatigue failure, wear, breakage and decrease of positive retention between accessory and base structures using current releasable locking mechanisms is overcome.

8 Claims, 3 Drawing Sheets

RELEASABLE LOCKING MECHANISM

BACKGROUND OF THE INVENTION

1. Technical Field

This invention relates generally to a locking mechanism for mechanically securing two components together, and more specifically to such a locking mechanism that is particularly suitable for locking an accessory device onto a portable telecommunication instrument.

2. History of Related Art

Several arrangements are used for locking accessory devices, such as battery chargers, power supply adapters, hands-free operation adapters, and the like to a base structure, such as a radiotelephone. The locking mechanisms are generally provided on the accessory structure, and typically include one or more molded plastic arms that engage a mating feature on the base structure. The plastic arms are deflected by a user to remove or insert the arms into a mating feature on the base structure, and thereby disconnect or attach the accessory device to the base structure. When the deflecting force applied by the user to the arms is released, the arms spring outwardly thereby secure the accessory device to the base member.

Such molded plastic arm configurations do not hold up well when subjected to repeated deflection, eventually resulting in a loose fit and even breakage of the plastic arm. This problem results in a limited life cycle for the accessory device. Repair of the plastic arms generally requires disassembly of the accessory adapter at a service center. Often repair costs exceed the cost of purchasing a new accessory. Also, such deflectable arm locking mechanisms have heretofore been cumbersome to operate because deflection of the arms is generally accomplished by squeezing two arms toward each other to remove or attach the accessory device. This operation may be difficult for a person having limited manual dexterity.

Other methods currently used to attach an accessory device to a base structure include press-fit designs which typically require significant insertion force. Such press-fit designs are subject to high early wear rates, and are often difficult to secure for proper electrical connection and remove for subsequent disconnection from the mating structure.

The present invention is directed to overcoming the problems set forth above. It is desirable to have a simple, easy-to-use, locking mechanism for attaching an accessory structure to a base structure. It is also desirable to have such a locking mechanism that is releasable in response to depressing a single button which provides positive, tactile feedback to the user. It is also desirable to have such a releasable locking mechanism in which the locking arms are minimally stressed and will withstand repeated deflection over the life of the accessory device.

SUMMARY OF THE INVENTION

In accordance with one aspect of the present invention, a releasable locking mechanism for attaching an accessory structure to a base structure having at least two spaced apart slots extending through a wall of the base structure housing, comprises at least two arms extending outwardly from a surface of the accessory structure. The arms are normally biased to a position at which the arms are readily insertable and removable from the slots in the base structure, and are moveable to a position at which the arms are locked in the slots in response to forcedly maintaining the arms at a spaced apart distance greater than the distance at which the arms are disposed when at their normally biased position.

Other features of the releasable locking mechanism embodying the present invention include the arms being leaf springs, preferably formed of spring steel. Each of the leaf springs has a distal end that extends outwardly from a first wall of the accessory structure housing and is adapted to engage a respective one of the slots extending through the base structure housing wall. Additional features include the releasable locking mechanism having at least two elongated pins disposed in the accessory structure housing that are moveable along a longitudinal axis of the pins. Each of the pins have a first end disposed adjacent a respective one of the arms and a second end that is biased toward a predefined position within the accessory housing by a respective one of the arms.

Still other features include an actuator having a first end portion that is extendable through an aperture in a second wall of the accessory structure housing, a second end portion biasedly maintained at a position in abutment with each of the second ends of the elongated pins, and an intermediate portion between the first and second portions. The second and intermediate portions of the actuator have separately defined thicknesses, wherein the thickness of the second end portion is greater than the thickness of the intermediate portion. The actuator is movable from the biased position to a depressed position at which the intermediate portion of the actuator is aligned with the second ends of the elongated pins, and at which the second ends of the pins are urged into biased abutment with the intermediate portion of the actuator when the arms are at their normally biased release position.

Other features of the releasable locking mechanism include the base structure being the transceiver unit of a portable telecommunication instrument, and the accessory structure being a battery pack or auxiliary power supply adaptor arranged for interconnection with the transceiver unit.

The releasable locking mechanism further includes a means for maintaining the actuator at the biased position.

Other features of the releasable locking mechanism embodying the present invention include the distal ends of the leaf springs having an L-shaped flange extending in a transverse direction to the spring whereby the L-shaped flange is moved laterally into engagement with an interior surface of the wall of the base structure housing in response to the actuator button being at the biased position. Other feature of the leaf springs include the leaf springs being the legs of a U-shaped clip in which a base portion of the clip extends between respectively spaced apart second ends of the leaf springs.

Still other features of the releasable locking mechanism include the actuator having a tapered transition region disposed between the second and intermediate portions of the actuator, and the means for maintaining the actuator at the biased position being a coil spring disposed in biased abutment against the second end portion of the actuator.

BRIEF DESCRIPTION OF THE DRAWINGS

A more complete understanding of the structure and operation of the present invention may be had by reference to the following detailed description when taken in conjunction with the accompanying drawings wherein.

DETAILED DESCRIPTION OF PRESENTLY PREFERRED EXEMPLARY EMBODIMENTS

The releasable locking mechanism embodying the present invention is particularly suitable for attaching an accessory device, such as a battery pack, battery recharging adaptor, auxiliary power supply, hands-free operation adaptors and the like, to portable telecommunication instruments such as cellular telephones and similar portable radiotelephones.

Figure 1:
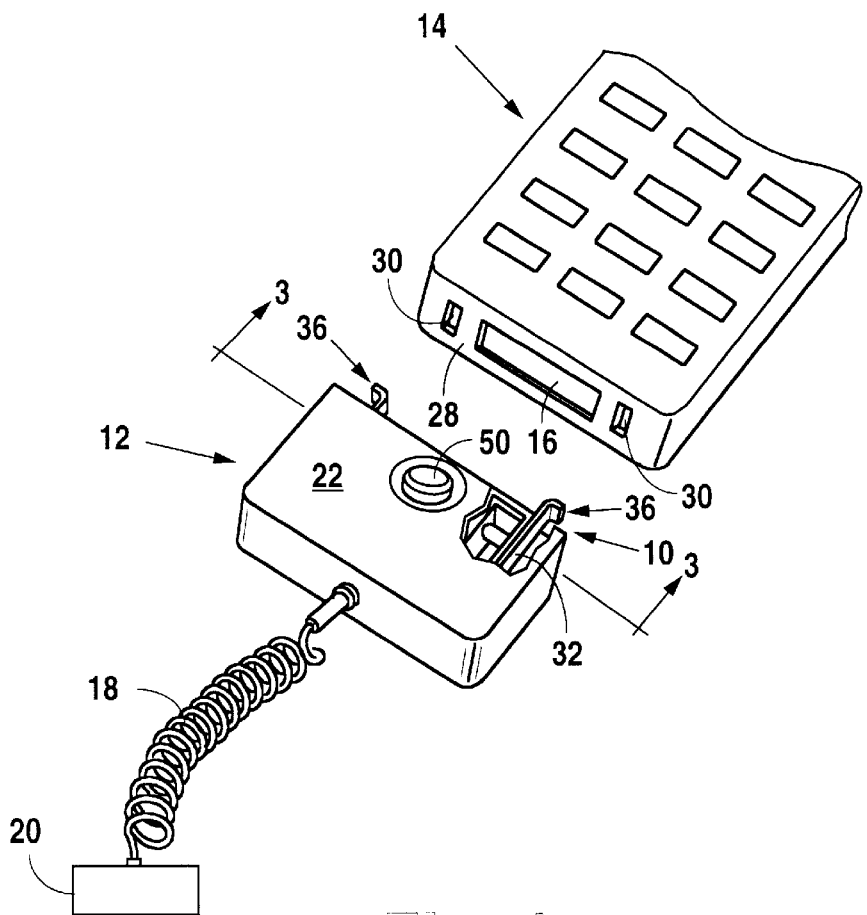
FIG. 1 is a three dimensional view of a radiotelephone transceiver and an accessory attachable to the transceiver in which the accessory has a locking mechanism embodying the present invention incorporated therein.
Figure 2:
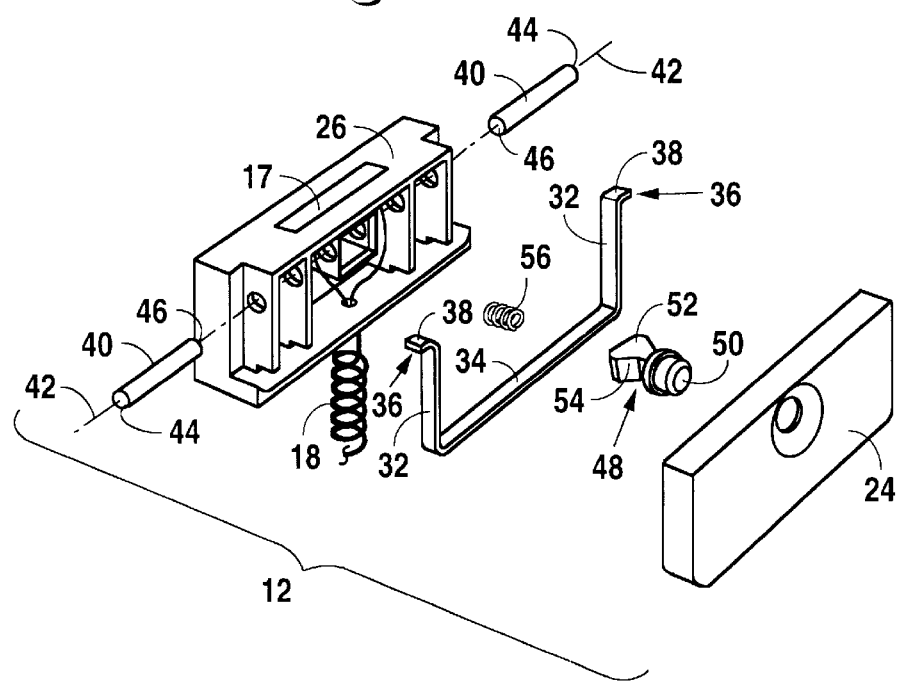
FIG. 2 is an exploded three dimensional view of the accessory structure shown in FIG. 1, showing details of the locking mechanism embodying the present invention.

In a preferred exemplary embodiment of the present invention, a releasable locking mechanism 10 is disposed within an accessory structure 12, adapted for attachment to a base structure 14. As shown in FIG. 2, the accessory structure 12 has surface-mounted contact features 17 represented by a rectangular area, and disposed on a face arranged to abut the base structure 14 and establish electrical contact with mating features 16 provided on the abutting face of the base structure 14, as also represented by a rectangular area as shown in FIG. 1. The mating features 16,17 typically are electrically conductive contact pads or, alternatively, sockets or pins arranged in a pattern to mate with cooperating sockets or pins mounted on the adjoining structure. In the exemplary embodiment, the accessory structure 12 has a coiled cable assembly 18 that extends between the mating features 17 on the face of the accessory structure 12 and an adaptor 20 that is arranged for plugging into an auxiliary power source, such as the cigarette lighter socket on a vehicle.

The accessory structure 12 has a housing 22 which has a front portion 24 and a rear portion 26. As best shown in FIG. 2, the electrical interconnection features 17 of the accessory structure 12 are mounted on a first surface of the housing 22 which is provided by a face panel of the rear portion 26 of the accessory structure housing 22. As shown in FIG. 1, the electrically mating features 16 on the base structure 14 are positioned on a wall 28 of the base structure 14 which abuts the accessory structure 12 when the accessory structure 12 is connected to the base structure 14. As shown in FIG. 1, the wall 28 of the base structure 14 also has a pair of spaced apart slots 30 formed therein that, is described below in greater detail are positioned to receive respective outwardly extending arms of the accessory structure 12.

Figure 3:
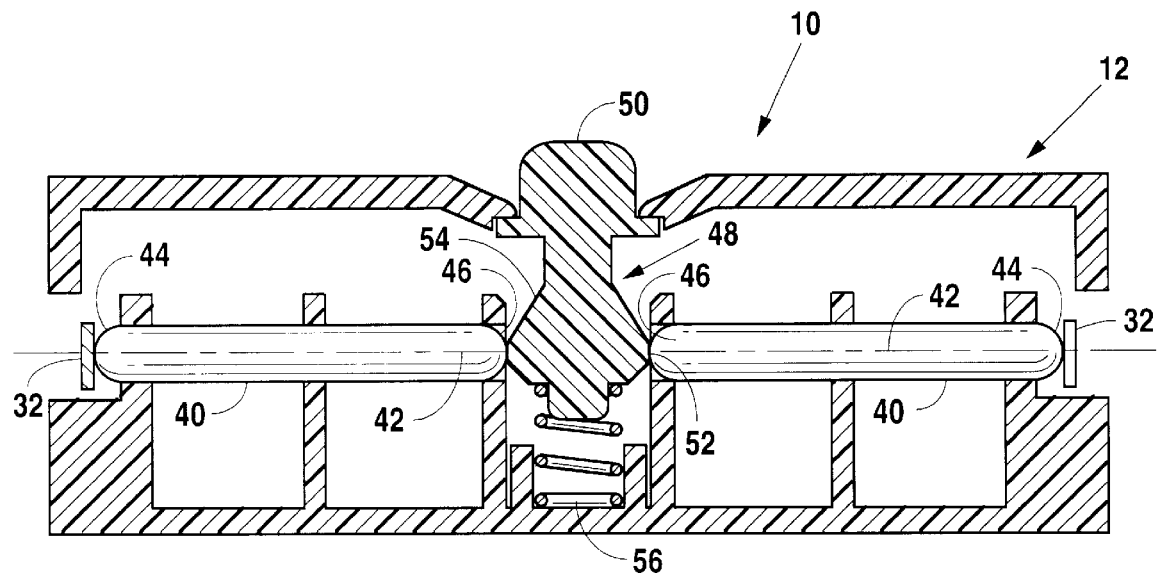
FIG. 3 is a cross section of the accessory structure, taken along the line 3—3 of FIG. 1, showing the locking mechanism at its locked position in which the locking arms are deflected outwardly.
Figure 4:
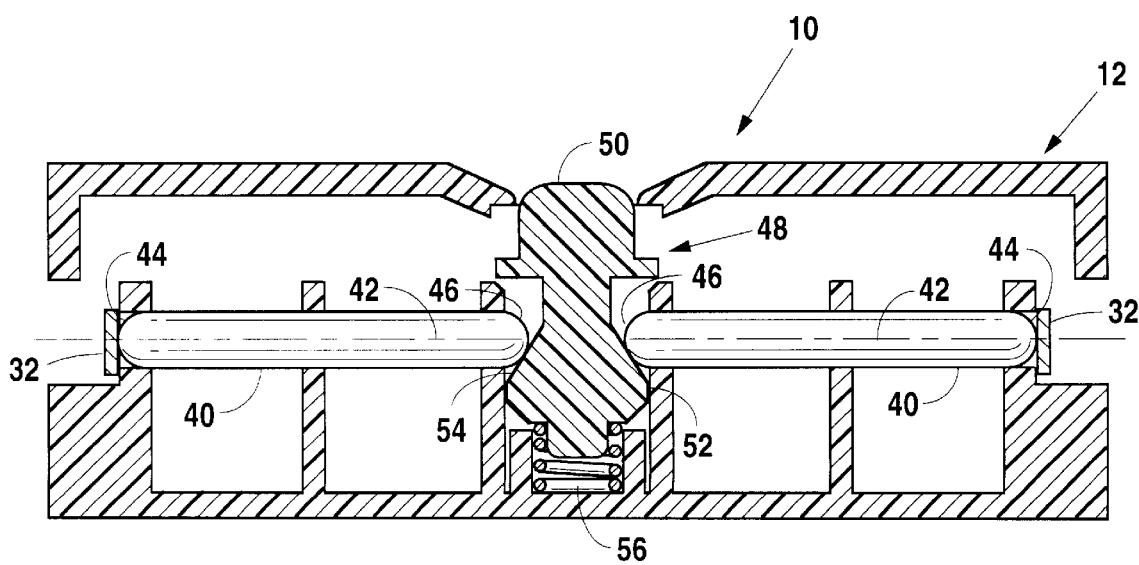
FIG. 4 is a cross sectional view of the accessory structure, similar to that shown in FIG. 3, in which the actuator of the locking mechanism is depressed and the arms of the locking mechanism are deflected inwardly to their normally biased position.

In the preferred embodiment of the releasable locking mechanism 10, the arms that extend outwardly from the accessory structure 12 and engage the slots 30 in the base structure 14, are leaf springs 32 that are mounted substantially within the accessory structure 12. Desirably, the leaf springs 32 are, as shown in FIG. 2, the legs of a generally U-shaped clip that has a base portion 34 extending between the lower ends of the upwardly extending legs 32. The metal clip, including the leg portions that form the leaf springs 32, is preferably formed of a flexible metallic material, such as spring steel. The metal clip is substantially enclosed within the accessory structure housing 22 with the exception of a distal end portion 36 formed at each outer end of the leaf springs 32. Each of the distal end portions 36 extend outwardly from the mating face wall of the housing 22 of the accessory structure 12 and are adapted to engage a respective one of the slots 30 formed in the base structure housing wall 28. More specifically, as shown in FIGS. 2–4, the distal end portions 36 of the leaf springs 32 have an L-shaped flange 38, or alternatively a curved hook, extending in a direction transverse to the respective leaf spring 32. As will be described below in greater detail, when the L-shaped flanges 38 are moved laterally in a direction away from each other, each of the flanges 38 engage an interior surface of the base structure wall 28 adjacent a respective slot 30. The distal end portions 36 of the leaf springs 32 are normally biased i.e., in the free state without any applied external force, toward a release position at which of the flanges 38 are not engaged with the internal surface of the base structure wall 28, and the distal end portions 36 can be withdrawn from the respective slots 30. The leaf springs 32 are also movable, as described below in greater detail, toward a locking position at which of the distal ends 36 are forcedly retained within a respective one of the slots 30 formed in the base structure wall 28.

The releasable locking mechanism 10 further includes a pair of elongated pins 40 that are slidably disposed within the accessory structure housing 22 and movable along a longitudinal axis 42 of the pins 40. As best shown in FIGS. 3 and 4, each of the pins 40 has a first end 44 that abuts a respective one of the leaf springs 32 and a second end 46 that is spaced from the first end 44. The pins 40 are biased inwardly toward the center of the accessory structure 12 so that the second end 46 of each of the pins 40 is biased toward a predefined position, as described below, within the accessory structure housing 22.

The releasable locking mechanism 10 embodying the present invention further includes an actuator 48 having a first end portion 50 that extends through a second wall of the housing, formed in the front portion 24 of the housing 22 as shown in FIG. 2, a second end portion 52, and an intermediate portion 54 disposed between the first and second end portions 50,52. A coil spring 56, positioned between the second end portion 52 of the actuator 48 and an internal wall surface of the rear portion 26 of the housing 22, provides a means for maintaining the actuator 48 at a biased position at which the first portion 50 of the actuator 48 extends through the front portion 24 of the housing 22. Moreover, when in the biased position, the second ends 46 of the pins 40 are biasedly maintained, by the leaf springs 32 which are deflected outwardly from their normal biased position, in abutment with the second end portion 52 of the actuator 48. When the actuator 48 is depressed, as a result of applying finger pressure against the first end portion 50 of the actuator 48, the actuator 48 moves against the bias force of the coil spring 56 to a depressed position at which the intermediate portion 54 of the actuator 48 is aligned with the longitudinal axes 42 of the elongated pins 40 and the second ends 46 of the pins 40 are urged into biased abutment, by the leaf springs 32 to the above-discussed predefined position against the intermediate portion 54 of the actuator 48.

As illustrated in the drawings, the intermediate portion 54 may comprise a tapered section that angles inwardly from the thicker second end portion 52, toward the first end portion 50 of the actuator 48. Importantly, when the actuator 48 is moved to the depressed position as shown in FIG. 4, the pins 40 move inwardly, under the influence of the leaf springs 32, so that the leaf springs 32 are at their normal biased position whereat the distal end portions 36 are spaced closer to each other. When at their normal biased position, the distal end portions 36 of the leaf springs and may be withdrawn from locking engagement with the base structure 14 by simply withdrawing the end portions 36 from the slots 30 formed in the wall 28 of the base structure 14.

In like manner, the accessory structure 12 can be attached to the base structure 14 by depressing the first end portion 50 of the actuator 40, thereby moving the actuator 48 to the depressed position, whereat the second ends 46 of the pins are at the predefined position in abutment with the intermediate portion 54 of the actuator 48. When pressure on the first end portion 50 of the actuator 48 is released, the coil spring 56 moves the actuator 48 to the biased position shown in FIG. 3, at which the second ends 46 of the elongated pins 40 are in biased abutment with the second end portion 52 of the actuator 48.

Figure 5:
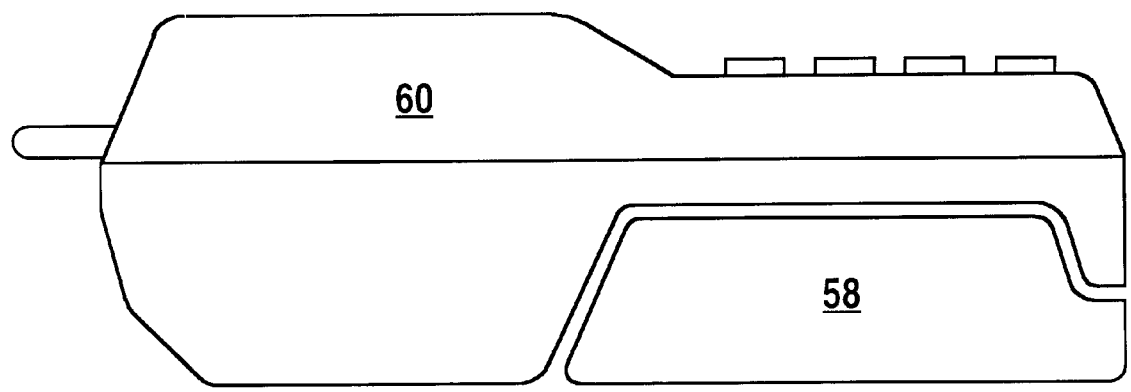
FIG. 5 is a side view of a cellular telephone having a removable battery pack in which the releasable locking mechanism embodying the present invention is operatively disposed.
Figure 6:
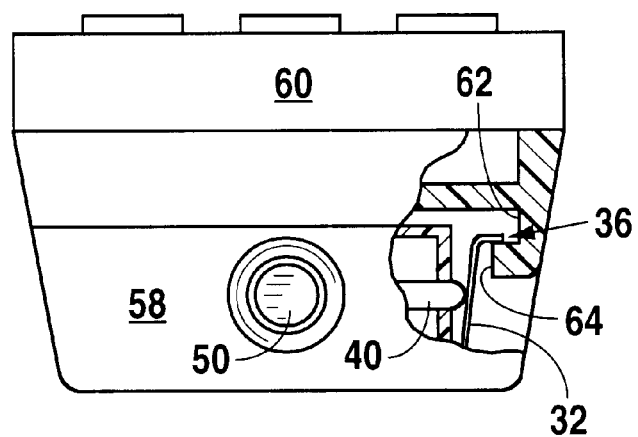
FIG. 6 is an end view of the cellular telephone shown in FIG. 5, with portions of the battery pack and the lower housing of the telephone broken away to show details of the releasable locking mechanism embodying the present invention.

In an alternative embodiment illustrated in FIGS. 5 and 6, the releasable locking mechanism 10 embodying the present invention is specifically adapted to provide retention of a battery pack 58 in the transceiver portion 60 of a cellular telephone. In this embodiment, the distal end portions 36 of the leaf springs 52 are urged outwardly, by the second end portion 52 of the actuator 48 and the intervening pins 40, into slots 62 formed in an internal wall surface 64 of the transceiver 60. In this embodiment, the first end portion 50 of the actuator 48 is positioned on an end face of the battery pack 58. When the first end portion 50 is depressed, the actuator 48 is moved to the depressed position and the pins 40 move inwardly, as described above, permitting the leaf springs 32 to return to their normal biased position at which the end portions 36 of the leaf springs 32 are disengaged from the slots 62 in the internal wall surface 64 of the transceiver 60. This permits the battery pack 58 to be separated from the transceiver portion 60, and recharged or replaced.

Thus, it can be seen that the releasable mechanism embodying the present invention is in its "active", or locking, position in the absence of any external force upon the actuator 48. When at the active position, the elongated pins 40 are at their maximum spaced apart distance because of their respective interface with the thicker second end portion 52 of the actuator 48. The elongated pins 40 also interface with the leaf springs 32 and force deflection of the leaf springs 32 in an outward direction away from each other. At this position, the leaf springs 32 are deflected from the normal position and the distal end portions 36 are correspondingly spaced at a maximum distance from one another.

When external pressure is placed on the first end portion 50 of the actuator 48, as illustrated in FIG. 6, the actuator 48 is depressed inwardly and the second ends 46 of the elongated pins 40 engage the reduced thickness intermediate portion 54 of the actuator 48. This allows the elongated pins 40 to move inwardly toward each other and allows the leaf spring 32 to return to a normally biased position whereat the leaf springs 32 exert minimal force against the pins 40. To attach the accessory structure 12 to the base structure 14, the accessory structure 12 is aligned with the base structure 14. With the mating features 16 and 17 in their respective desired alignment, and the external force on a second end portion 50 of the actuator 48 removed. The actuator 48 is then moved to its normally biased position be the force imposed by the coil spring 56, and the leaf springs 32 are deflected outwardly by the pins 40 so that the distal end portions 36 of the leaf springs 32 extend into the slots 30 and are captured within the base structure 14. The accessory structure 12 is thus securely attached to the base structure 14, and is maintained in secured attachment during use, but can be readily released when desired by simply depressing the first end portion of the actuator 48.

Although the present invention is described in terms of preferred exemplary embodiments, and specific examples given of base and accessory units that may be interconnected using the releasable locking mechanism described and claimed herein, those skilled in the art will recognize the changes in those components, and in the specific arrangement of the accessory and base components, may be made without departing from the spirit of the invention. Such changes are intended to fall within the scope of the following claims. Other aspects, features and advantages of the present invention may be obtained from the study of this disclosure and the drawings, along with the appended claims.

What we claim is:

1. A releasable locking mechanism for attaching an accessory structure to a base structure wherein the accessory structure and the base structure each have a housing with said base structure housing having at least two spaced apart slots formed in a wall of the base structure housing, said releasable locking mechanism comprising:

at least two leaf springs mounted in said accessory structure, each having a distal end extending outwardly from a first wall of said accessory structure housing and adapted to engage a respective one of the slots extending through the base structure housing wall, said distal ends being normally biased toward a release position at which each of said distal ends can be withdrawn from said respective slot and moveable toward a locking position at which each of said distal ends are forcedly retained within the respective slot;

at least two elongated pins disposed in said accessory structure housing and moveable along a longitudinal axis of said pins, each of said pins having a first end disposed adjacent a respective one of said leaf springs and a second end spaced from said first end and biased toward a predefined position within said accessory structure housing by said respective leaf spring;

an actuator having a first end portion that is extendable through an aperture in a second wall of said accessory structure housing, a second end portion spaced from said first end portion and biasedly maintained at a position in abutment with each of said second ends of the elongated pins disposed at said predefined position, and an intermediate portion disposed between said first and second end portions, said second portion and said intermediate portion of the actuator each having separately defined thicknesses wherein the thickness of the second end portion is greater than the thickness of said intermediate portion, said actuator being movable from said biased position at which each of said second ends of the elongated pins is biasedly maintained in abutment with the second end portion of the actuator, to a depressed position at which said intermediate portion of the actuator is aligned with the longitudinal axes of said elongated pins and the second ends of said elongated pins are urged into biased abutment with said intermediate portion of the actuator by respective ones of said leaf springs and said leaf springs are disposed at their normally biased release position and each of said distal ends of the leaf springs can be withdrawn from said respective slots in the base structure housing; and, a means for maintaining said actuator at said biased position at which each of said second ends of the elongated pins is biasedly maintained at said predefined position adjacent the second end portion of the actuator.

2. A releasable locking mechanism, as set forth in claim 1, wherein the distal ends of said leaf springs have an L-shaped flange extending in a transverse direction to the leaf spring whereby said L-shaped flange is moved laterally into engagement with an interior surface of the wall of the base structure housing in response to said actuator button being at said biased position whereat the second end portion of the actuator button is maintained in abutment with the second ends of the elongated pins.

3. A releasable locking mechanism, as set forth in claim 1, wherein said at least two leaf springs comprise a pair of leg portions of a U-shaped clip in which a base portion of the clip extends between respectively spaced apart second ends of the leaf springs.

4. A releasable locking mechanism, as set forth in claim 1, wherein the intermediate portion of said actuator has inwardly tapered surfaces such the actuator reduces in thickness from said second end portion toward said first end portion.

5. A releasable locking mechanism, as set forth in claim 1, wherein said means for maintaining the actuator at the biased position comprises a coil spring disposed in biased abutment against the second end portion of the actuator.

6. A releasable locking mechanism, as set forth in claim 1, wherein the base structure comprises a transceiver unit of a portable telecommunication instrument.

7. A releasable locking mechanism, as set forth in claim 1, wherein said base structure comprises a transceiver unit of a portable communication instrument and said accessory structure comprises a battery pack adapted for interconnection with said transceiver unit.

8. A releasable locking mechanism, as set forth in claim 1, wherein said base structure comprises a transceiver unit of a portable communication instrument and said accessory structure comprises an adapter for connecting said transceiver unit to an auxiliary power supply.

\* \* \* \* \*